United States Patent [19]

Narayanaswamy et al.

[11] Patent Number: 6,165,524
[45] Date of Patent: Dec. 26, 2000

[54] SHELF STABLE BATTER ARTICLE AND METHOD OF PREPARATION

[75] Inventors: Venkatachalam Narayanaswamy, Maple Grove; Lloyd E. Metzger, Champlin; James E. Langler, White Bear Lake; David W. Tobelmann, Plymouth; Linda R. Kreisman, St. Paul, all of Minn.

[73] Assignee: General Mills, Inc., Minneapolis, Minn.

[21] Appl. No.: 09/428,026

[22] Filed: Oct. 27, 1999

Related U.S. Application Data

[63] Continuation-in-part of application No. 09/398,729, Sep. 17, 1999.

[51] Int. Cl.[7] .......................... A21D 10/04; A21D 10/02; A21D 10/00
[52] U.S. Cl. .......................... 426/128; 426/391; 426/399; 426/552; 426/558; 426/561
[58] Field of Search ..................... 426/128, 391, 426/399, 552, 558, 561

[56] References Cited

U.S. PATENT DOCUMENTS

| | | | |
|---|---|---|---|
| 2,982,662 | 5/1961 | Cochran | 99/192 |
| 3,649,304 | 3/1972 | Fehr, Jr. et al. | 99/192 |
| 3,862,341 | 1/1975 | Johannes . | |
| 4,353,932 | 10/1982 | Bone | 426/553 |
| 4,774,099 | 9/1988 | Feeney et al. . | |
| 4,904,493 | 2/1990 | Petrizzeli . | |
| 4,940,595 | 7/1990 | Yasosky et al. . | |
| 5,034,241 | 7/1991 | Keyser et al. . | |
| 5,106,635 | 4/1992 | McCutchan et al. | 426/107 |
| 5,178,893 | 1/1993 | Seewi et al. . | |
| 5,384,139 | 1/1995 | Vasseneix | 426/128 |
| 5,409,720 | 4/1995 | Kent et al. . | |
| 5,447,739 | 9/1995 | Emanuelson et al. | 426/552 |
| 5,514,387 | 5/1996 | Zimmerman et al. . | |
| 6,013,294 | 1/2000 | Bunke et al. | 426/120 |
| 6,024,997 | 2/2000 | Blaschke . | |
| 6,030,654 | 2/2000 | Thomas et al. . | |
| 6,039,994 | 3/2000 | LeFlecher et al. | 426/553 |

FOREIGN PATENT DOCUMENTS

| | | |
|---|---|---|
| 0868850 | 10/1998 | European Pat. Off. . |
| WO99/04640 | 2/1999 | WIPO . |

*Primary Examiner*—Nina Bhat
*Attorney, Agent, or Firm*—John A. O'Toole; Douglas J. Taylor; Everett G. Diederiks

[57] ABSTRACT

A shelf stable ready-to-bake batter article for baked goods comprises an unpressurized gas impermeable container, low water activity, batter with a leavening system disposed within the container and partially filling the container and an inert low oxygen gas in the headspace not filled by the batter. The ratio of sugar to flour in the batter ranges from about 0.5:1 to 2.5:1. The batter has a water activity of less than 0.85.

36 Claims, No Drawings

SHELF STABLE BATTER ARTICLE AND METHOD OF PREPARATION

CROSS REFERENCE TO RELATED APPLICATION

The present application is a continuation-in-part application to U.S. Ser. No. 09/398,729 (filed Sep. 17, 1999) entitled "Shelf Stable Batter Article and Method of Preparation".

FIELD OF THE INVENTION

The present invention relates to packaged food articles and to their methods of preparation. More particularly, the present invention relates to articles comprising a gas-impermeable container and a sugar, flour, starch based batter for baked goods that are storage stable at room temperature.

BACKGROUND

Baked goods such as brownies, cakes, cookies, and muffins are popular consumer snack food and dessert food items. A wide variety of recipes are currently available for use by consumers to prepare small quantities of baked goods from various ingredients.

For greater convenience and shelf stability, dry mixes for baked goods have long been available. The consumer mixes the dry mix with liquid ingredients such as water, milk, oil and/or eggs to form a batter. The batter is then immediately poured into a baking pan and baked to form the finished baked goods.

Useful developments in the formulation of dry mixes for baked goods continue to be made. For example, an improved dry mix for brownies is disclosed in U.S. Ser. No. 08/929,827 filed Sep. 15, 1997 by Palmer et al entitled "Dry Mix for Baked Goods with Gellan Gum and Method of Preparation" (which is incorporated herein by reference). The dry mixes for brownies disclosed therein include gellan gum in addition to other ingredients. The dry mixes not only are useful for preparing high quality finished baked goods by consumers for home use, but also can be used for the large scale production of finished baked goods suitable for refrigerated sales and distribution. While the formulation for the dry mix is improved, the dry mixes are packaged in a conventional manner in a sealed bag placed in a conventional carton or in pouches without the carton.

While dry mixes for home use are convenient, current trends for consumer package food products favor products of even greater convenience. The present invention provides improved products of greater convenience. The present invention provides articles comprising ready-to-bake batters that are shelf stable and can be stored at room temperatures for extended periods of time.

Refrigerated ready-to-bake batters having relatively short shelf lives are also known. One concern with such products is bacterial growth. A second problem resides in providing a leavening system that retains functionality over extended storage. Acidifying the batter desirably extends bacterial stability. However, the acidity undesirably tends to interact with the leavening system, and adversely affects flavor by leaving an undesirable acid aftertaste. With poor leavening, the finished baked goods exhibit undesirable volume and poor texture.

The present invention provides ready-to-bake batters for finished baked goods that are stable even at room temperature. The present articles thus provide the benefits combination of shelf stability of conventional dry mixes with the greater convenience of ready-to-bake batters.

Shelf stable batters for finished baked articles are commercially available, for example, in France made as described in EP 868,850 A published Oct. 7, 1998. Such articles comprise an impermeable flexible membrane pouch containing a batter comprising a $CO_2$ gas producing leavening system and an inert gas atmosphere.

The parent application U.S. Ser. No. 09/398729 is an invention that resides in part in the surprising discovery that a $CO_2$ gas producing leavening agent is not an essential ingredient in the present packaged ready-to-bake batters.

The present invention provides improvements in those articles described in U.S. Ser. No. 09/322,208 (filed May 28, 1999) entitled "Shelf Stable Brownie Batter Article and Method of Preparation" which is incorporated herein by reference. The improvement resides in important part that highly leavened or expanded finished baked goods such as layer cakes, quick breads, muffins, pancakes, etc, can be provided from shelf stable batters. The products mentioned above have a considerable more leavened cell structure (lighter texture) than brownies, which rather have a denser cell structure (heavy dense texture).

The present invention provides further improvements in those articles and methods of preparation described in parent application U.S. Ser. No. 09/398,729 and in EP 868,850. The present invention provides articles comprising $N_2O$ aerated batters that additionally essentially comprise both hydrated emulsifiers and defined levels of a palm stearine component. Batters additionally comprising the combination of these two additional components are better able to incorporate $N_2O$ into the batter, stabilize these gas cells over extended periods of time. Consequently, a finer cell grain structure can result in the final baked product. Still another difference from the U.S. Ser. No. 09/398,729 is that the batters can optionally additionally comprise conventional chemical leavening ingredients.

SUMMARY OF THE INVENTION

In its product aspect, the present invention resides in shelf stable ready-to-bake batter articles that provide improved finished baked goods but do not require refrigeration. The articles comprise an unpressurized gas impermeable container, a neutral pH, low water activity, batter that is disposed within the container and an inert low oxygen gas or gases in the headspace not filled by the batter.

The batter essentially comprises sugar, flour, water, fat and the balance of conventional batter ingredients such as starches, flavors (e.g., chocolate), egg or egg solids, humectants, gums, salt, etc. The sugar to flour ratio ranges from 2.5:1 to about 0.5:1. The batter additionally essentially comprises both hydrated emulsifiers and about 1% to 10% of a palm oil hardstock ingredient. Specifically this includes a high melting point fraction of palm oil rich in palmitic acid. The batter's water activity is less than 0.85. The pH ranges from about 6.0 to 8.5. The batter has incorporated therein sufficient amounts of $N_2O$ gas to provide the batter with an initial density of about 0.7 to 1.1 g/cc. IN certain embodiments, the batter only contains protected leavening system or a combination of both gas and protected chemical leavening system.

The headspace inert gas has an oxygen content of less than 4%, preferably less than 2%. $N_2O$ essentially comprises at least a portion of the headspace inert gas. However, in certain embodiments where nitrous oxide is not admixed with the batter, $N_2O$ need not be present in the headspace.

In its process aspect, the present invention is directed to processes for making a ready-to-bake batter article that is shelf stable at room temperature. The process comprising the steps of:

providing an open sealable, gas impermeable container;
dispensing a farinaceous batter within at least a portion of the container, said farinaceous batter comprising:
   about 20 to 70% sugar
   about 10 to 40% flour
   about 0 to 5% egg solids
   about 0.1 to 3% salt
   about 0.1 to 6% hydrated emulsifiers
   about 1 to 25% fat, at least a portion of which is palm oil hardstock
   about 5 to 30% moisture
   said batter having a sugar to flour ratio of about 2.5:1 to 0.5:1
   a water activity of less than 0.85
   a pH of about 6 to 8.5; and
   said batter having sufficient amounts of $N_2O$ to provide the batter having a density of about 0.7 to 1.1 g/cc or a protected chemical leavening system or both;
filling the headspace portion of the container that is unfilled with the batter with an inert gas having an oxygen content of less then 4%;
sealing the container the form a shelf stable ready-to-use batter article.

DETAILED DESCRIPTION OF THE PREFERRED EMBODIMENT

The present invention relates to packaged ready-to-bake batters for baked goods characterized by shelf stability at room temperature and to their methods of preparation and use. Each of the product components as well as product use and attributes and methods of their preparation are described in detail below.

Throughout the specification and claims, percentages are by weight and temperatures in degrees Fahrenheit unless otherwise indicated.

The present articles or products essentially comprise a gas impermeable container; a low water activity batter disposed within and partially filling the container; and an unpressurized, inert low oxygen gas in the unfilled headspace.

The container can be flexible or rigid or semi rigid and of any suitable shape or configuration.

For example, widely available pouches fabricated from flexible laminate materials having low gas permeability are suitable for use for the gas impermeable container. A suitable laminate is a polyester-aluminum-polyester laminate. Tubs fabricated from plastic, glass or metal are also useful. In other variations, the container or portions thereof can serve as a disposable baking container. For example, the container can comprise an aluminum or an ovenable plastic baking tray or tub having an overlaying peelable gas impermeable foil membrane. Having the container function as the baking container adds further convenience by eliminating transfer of the batter from the container to the baking utensil.

The articles further essentially include a ready-to-bake or use batter disposed within the container. The batters essentially comprise sugar, flour, fat, moisture, hydrated emulsifiers, a palm oil hardstock ingredient (added either by itself or as part of an emulsified shortening), and sufficient amounts of $N_2O$ to provide a batter having a density of about 0.7 to 1.1 g/cc. The batter may optionally only contain protected chemical leavening system but no mixed N2O gas. The batter preferably contains both N2O admixed with the batter and protected chemical leavening system.

Batters and doughs are distinguishable compositions even though each comprises some number of common ingredients.

"Dough" as used herein refers to an intermediate food product that has a gluten based structure. In dough, the gluten forms a continuous dough elastic medium into which other ingredients are embedded. A dough is typically prepared by beating, blending, cutting or kneading and is often stiff enough to cut into various shapes. Doughs generally are used for low sugar to flour ratio products such as breads, biscuits, etc. Doughs while plastic are not flowable.

In contrast, "Batter" as used herein refers to an intermediate food product that essentially contains flour, water, and salt and optionally fat, eggs, and sugar(s) that are a starch batter based composition. In a batter, gluten development is purposefully minimized. Batters are inelastic and are more flowable than dough. Liquid added to make the batter forms a continuous batter medium in which other ingredients are dispersed. A batter cooks into a soft, moist and sometimes crumbly product. A batter is typically prepared by blending, creaming, stirring or whipping and is generally thin enough to pour or scoop or squeeze out of a container.

Flour

The present batter compositions essentially contain from about 10 to 40% of the batter of flour. Conventionally, flour is standardized to about 14% moisture. However, dried flours with considerable lower moisture contents can also be used. Flour(s) useful herein can be of conventional type and quality including cake flour, bread flour and all-purpose flour. Wheat flours are preferred but other flours conventionally used in the preparation of baked goods can also be employed in full or partial substitution for the wheat flour. Traditional cake flour used for layer cakes has about 8% or less protein by weight of the flour. Pastry flour ordinarily has a protein level of about 10%. Other flours such as bread flour generally have higher protein levels of about 11 to 13% by weight. The preferred protein range for the wheat flour useful in this invention is between about 7 to 10% by weight of the flour. An all-purpose flour also can be used. Such all-purpose flour generally comprises a mixture of both hard and soft wheat flours, i.e., both high protein level and low protein level flours. Such flours are useful if the average protein content ranges from about 7 to 10% by weight.

Both chlorinated or unchlorinated flours can be used depending on the application. However, malted flours that are typically used for bread making should be avoided. Unmalted flours selected for use herein should be of high quality and desirably are from wheats with minimal sprout damage. Enzyme inactivated flours can also be used.

Sugar

The batter compositions of the present invention also essentially comprise from about 1% to 70%, preferable about 20 to 50% of the batter comprising sugar or nutritive carbohydrate sweetener ingredient. Typically, sucrose is used in mixes for baked goods as the sugar ingredient. The use of reducing sugars such as dextrose, fructose, maltose, lactose, etc. is limited because of their ability to cause brown coloration of the batter via non-enzymatic browning. Commercially available milled sugar can be used and some applications can require sugar of a particular particle size. Sugar is either dry or as a sugar syrup. Most of the sugar is preferable added as a dry ingredient. However, some portion of the sugar is preferable added in a hydrated form such as a sugar syrup such as corn syrup or maltose syrup or fructose syrup.

Sugar to Flour Ratio

The baker's ratio is the weight ratio of sugar to flour. The baker's ratio is used to provide desired baked good attributes. The baker's ratio of the baked goods batters herein can range from about 0.5:1 to 2.5:1, that is from about ½ part sugar to one part flour to about 2½ parts sugar to one part flour. Preferably, the sugar to flour ratio of the present batters range from about 0.5:1 to 2.0:1. Maintenance of the sugar to flour ratio within the range is important to providing finished baked goods having the desired eating qualities. The sugar-to-flour ratio is also important to obtaining the desired shelf storage at room temperature benefit provided by the present improved articles.

Fat Component

The present batter or dough compositions can also comprise from about 1% to 25% of an edible fat or shortening ingredient, preferably about 10% to 25%. A shortening component adds richness to the eating properties of the finished baked goods. The particular fat constituent level will depend particularly upon the desired type of finished baked good desired and its properties.

Maintenance of shortening concentrations within these limits is important for providing baked goods of acceptable textural qualityConventional shortening materials are suitable for use as the shortening ingredient of the present batters. Such conventional shortening materials are well known in the baked goods art. The conventional shortenings useful herein are fatty glyceridic materials that can be classified on the basis of their physical state at room temperature. Liquid shortenings or oils can be used and provide the advantage of ease of incorporation. Solid shortening can also be used and provides the advantage of desirable mouth feel upon consumption. More commonly, and preferred for use herein, are partially hydrogenated oils which typically have liquid and solid fractions Such mixes can be fluid or plastic depending in part upon the level of solid fatty materials. Shortenings of this type comprise liquid oil containing from about 2 to 26% normally solid fatty glycerides. That is, solids fat index ("SFI") at 70° and 4% to 6% at 100° F.

The solid fatty glycerides can include fatty monoglycerides and diglycerides of saturated fatty acids having 16 to 22 carbon atoms. The liquid shortening can be animal, vegetable or synthetic oil (e.g., sucrose polyesters) which is liquid at ordinary room temperatures. Representative of such liquid shortenings are coconut oil, palm kernel oil, cottonseed oil, peanut oil, olive oil, sunflower seed oil, sesame seed oil, corn oil, safflower oil, poppy seed oil, soybean oil, canola (rapeseed) oil, babassue oil and the like. Other suitable shortening materials and methods of shortening preparation are described in detail in Bailey, "Industrial Oil and Fat Products," (3rd ed. 1964) which is incorporated herein by reference.

Mixtures of the above oils can also be used herein as can solid fatty materials, such as saturated triglyceride fats.

Surprisingly, the fat constituent provides a solute into which $N_2O$ gas is admixed as described in detail below.

Palmitic Acid Component

The present compositions essentially comprise about 1% to 10% of fractionated palm oil fraction. This fraction has high melting point range and is rich in palmitic acid. That is, at least a portion of the shortening component is provided by the palm oil hardstock fraction. In some application, the palm oil hardstock is blended into the shortening component, which additionally may contain emulsifiers and, is therefore added as part of an emulsified shortening system. In other applications, the palm oil hardstock can be separately added to the composition.

The palm oil hardstock, it is believed, prevents coalescence of the $N_2O$ gas cells by directing formation of beta prime crystals that are the basic structural element of a three dimensional matrix which holds the tiny gas cells. This palm hard fraction seems to be especially effective as it has been found that other beta prime crystal tending shortenings such as cottonseed oil or partially hydrogenated palm oil is not nearly as effective. Thus, the palm oil hardstock is important to the realization of a low-density batter that is able to substantially maintain its density over extended storage periods. A palm oil hard fraction is the fraction obtained from winterization of a partially hydrogenated palm oil. The crystallized solids are screened out from the chilled palm oil to provide the palm oil hard fraction. Suitable palm oil hardstock fractions are commercially available from AC Humko (Memphis, Tenn.). The palm oil hardstock fraction has an iodine value of about 35±10 and an elevated level of C-16 or palmitic fatty acids ($\geq 50\%$). Thus, the particular hardstock has a fatty acid profile different from palm oil, which typically has about a 40% palmitic acid content. Also useful herein is a fully hydrogenated palm oil hardstock fraction or a palm oil hardstock stearine or "palm stearine" as used herein.

Palm oil is to be distinguished from palm kernel oil. Both palm kernel oil and palm oil are obtained from the same plant but from different parts. Palm kernel oil is obtained by expression of palm kernels. Palm oil is obtained from the husks rather than the seed nut. Palm oil is characterized by a red color resulting from a high carotene level. Also, palm oil is characterized by high levels of palmitic and oleic acids whereas palm kernel oil is a lauric oil similar to coconut oil, having little palmitic or oleic acid. Palm oil is fluid at room temperature in contrast to palm kernel oil.

As noted above, palm oil (and its hardstock fractions) are characterized by high levels of C-16 fatty acids. Surprisingly, other oils having a high proportion of C-16 fatty acids such as cottonseed oil and beef tallow are not effective for use herein. A partially hydrogenated cottonseed oil should also work in substitution for the palm oil hard fraction but surprisingly does not work. The cottonseed oil ought to work because it also has a high level of palmitic acid.

Emulsifiers

The present batters further essentially comprise about 0.1–6% of emulsifier(s), preferably at least a portion of which is prehydrated. The shortening provides a convenient carrier for addition of emulsifiers to the batter. Such emulsifiers aid the realization of baked goods with improved grain structure and texture. The emulsifiers used herein help in not only creating numerous gas cells and finely dispersing and stabilizing them in the batter, but they also maintain the emulsion integrity of the batter over extended room temperature storage.

A portion of the emulsifier(s) component can be admixed with the shortening component in which case the emulsifiers are not prehydrated. Therefore higher amounts of emulsifiers are needed than when hydrated emulsifiers are used. The emulsifier typically comprises from about 1 to 20% of the shortening component, preferably from about 5 to 15% and, most preferably from about 10 to 15%.

However, at least a portion of the emulsifiers are prehydrated in an aqueous dispersion and added to the batter in their prehydrated form. In preferred embodiments, the batters comprise about 0.1–6% prehydrated emulsifiers in addition to any emulsifiers that are otherwise added such as being blended into the fat or shortening component. The prehydrated emulsifiers can also be part of an emulsion or dispersion with or without a fat component.

Generally useful as the emulsifiers are partially esterified polyhydric compounds having surface-active properties. This class of emulsifiers includes among others mono and diglycerides of fatty acids, organic acid esters of monoglycerides, and fatty acid esters. Mono and di-glycerides of fatty acids such as monostearin are commonly used emulsifiers. Preferably they are added as distilled monoglycerides because of their improved purity and better functionality due to decreased interference from diglycerides. Organic acids such as acetic acid, lactic acid, citric acid, diacetyltartaric acids are used to form esters with monoglycerides to give Acetem, Lactem, Citrem, and Datem respectively. These fall under the category of organic acid esters of monoglycerides. Some of the subclasses of emulsifiers included in the fatty acid ester category are: Polyglycerol esters of fatty acids (PGE's) wherein the glycerol moiety can be up to 10 or more glycerol molecules and the fatty acids can be Palmitic acid, Oleic acid, Stearic acid etc.; Propylene Glycol fatty acid ester (PGME's) with stearic acid such as Propylene glycol monostearate (PGMS) etc.; Sorbitan Fatty acid ester which are esters of fatty acids with sorbitol anhydride or sorbitan. Some examples are Sorbitan MonoStearate (Span 60) and sorbitan monooleate (Span 80). Sorbitan esters can be reacted with ethylene oxide to form Polyoxyethylene sorbitan esters such as Polysorbate 60 (polyoxy-20-ethylene sorbitan stearate), polysorbate 80 (polyoxy-20-ethylene sorbitan oleate), polyoxyethylene sorbitan monostearate (Tween 60), and polyoxyethylene sorbitan monooleate (Tween 80), etc.; Sodium Steroyl Lactylate (SSL); Sorbitan Tristearate (STS); Sucrose ester of fatty acids.

Another class of emulsifiers called phospholipids (for e.g. Lecithin) can also be used.

It is preferred to use a combination of emulsifiers mentioned above to give good whipping of gas cells in the batter, good dispersion of these gas cells in the batter, good stabilization of these gas cells against coalescence, good emulsion stability to prevent phase separation between fat and water, and good textural attributes such as moistness in the finished product.

Moisture

The present batters have total moisture content between 5% and about 30% moisture. The total moisture includes water provided with or associated with the various essential and optional ingredients. For example, total moisture includes the moisture associated with flour, starch, cocoa and liquid eggs if used. The total moisture can be easily determined by vacuum oven drying of the batters herein. In some embodiments, no added water is employed to formulate the present batters. Rather, only pasteurized liquid eggs provide moisture and the residual moisture associated with the dry ingredients. While in other embodiments dry egg solids are added, water is added to the batter as part of an emulsion or dispersion containing other active ingredients such as emulsifiers, polyols, etc.

The particular selection of ingredients and concentration are selected to provide batters having a water activity of less than 0.85 and for best results less than 0.85 to about 0.55. Selection of such water activity value is important to achieving a balance between microbial shelf stability and batter handling characteristics.

The present batters are preferably not highly acidified (i.e., are neutral) and thus range in pH from about 6.0 to 8.5. The combination of low oxygen gas in the headspace and a low water activity is sufficient to maintain shelf stability at room temperature.

If desired, the batters can optionally further comprises about 1 to 8% of a humectant, preferably about 1% to 6%. Humectant addition is helpful to achieve the present essential water activity level and the microbial shelf stability at room temperature provided by the present articles. The humectant can be any commonly employed humectant ingredient. Preferred humectants are selected from the group consisting of sorbitol, xylitol, mannitol, glycerin, glycerol, propylene glycol and mixtures thereof. Preferred for use herein is a mixture of sorbitol and glycerin or glycerin by itself.

In highly preferred embodiments, the present articles further comprise an anti-mycotic ingredient such as sodium, potassium sorbate, calcium propionate, or parabens. While not needed to maintain shelf stability, addition of such antimycotic ingredients is desired from a food quality standpoint in case the physical integrity of the article is comprised and oxygen leaks into the headspace. Preferred for use herein is methyl or propyl esters of parabens or combination thereof not exceeding 0.1% total. Most preferably the sodium salts of methyl and propyl esters of parabens can be used.

While the invention is specifically described in terms of improved baked goods, such as layer cakes, muffins, quick breads, cupcakes, biscuits, baked corn bread, the batters can be used for or formulated for use to prepare other cooked farinaceous goods within the scope of this invention including griddle cakes such as pancakes, crepes or cornbread, Irish soda bread or waffles. Also, while the present articles are especially suited for use for preparing leavened finished goods, other finished goods can also be prepared therefrom.

Batters for chocolate brownies or chocolate (e.g., "Devil's Food") cake are preferred herein and generally comprise about 2 to 12% cocoa, preferably about 4 to 10%.

The cocoa used in this invention is either natural or "Dutched" chocolate from which a substantial portion of the fat or cocoa butter has been expressed or removed by solvent extraction, by pressing, or by other means. Cocoa suitable for use in the process of this invention may contain from 1 to 30% fatty constituents.

Dutched chocolate is prepared by treating cocoa nibs with an alkali material such as potassium carbonate in a manner well known in the art. Generally, it tends to have a darker color and also can be more flavorful than natural cocoas.

Chocolate can be used in practicing the process of this invention and it is intended, therefore, that chocolate, as described above, to be encompassed by the term "cocoa". When chocolate is used, it should be in a finely divided form. It may be necessary to reduce the amount of shortening in the mix when chocolate is used because of the additional fat present as cocoa butter. It may also be necessary to add larger amounts of chocolate as compared to cocoa in order to provide an equivalent amount of flavoring and coloring.

Additionally hydrocolloids can be added as minor ingredients from 0–0.2%. Preferably Xanthan or Gellan gum may be added. However, other hydrocolloids such as guar, locust bean gum, carboxymethyl cellulose or others or mixtures thereof can be used to provide or improve beneficial textural attributes of the baked product.

When gellan gum or other calcium setting hydrophilic colloids are added to the batters, the batter can further beneficially comprise about 10 to 50 PPM soluble calcium. Calcium chloride or other calcium can provide the calcium salts.

Still another useful optional ingredient is starch. Starch addition can be used to influence a variety of product attributes including viscosity, finished baked goods' volume and texture. The starch used can be any of the common food starches, for example, potato starch, corn starch, wheat starch, rice starch, barley starch, oat starch, tapioca starch, arrowroot, and sago starch. Modified starches and pregelatinized starches can also be used. If present, the added starch ingredient(s) can comprise about 0.1 to 10%, preferably about 1 to 8% of the batter.

The present compositions can optionally contain a variety of additional minor ingredients or "conventional additives" suitable for rendering finished baked goods prepared therefrom more organoleptically desirable. Such optional dry mix components include anti-oxidants, flavor/coloring agents, salt, coloring agents, flavoring agents, flavor chips, nuts and fruit pieces, or other edible inclusions. Flavor chips include chocolate, mint chocolate, butterscotch, peanut butter chips and mixtures thereof. The flavor chips can be coated with topical film made of hard fat or edible shellac or others to minimize moisture and/or fat migration. If present, such optional components collectively comprise from about 1 to 25% of the batter of the present invention. In case of muffins, blueberries with controlled water activity are used so that water migration between the batter and blueberries are limited. The preferred water activity of the blueberries used is 0.85 however blueberries with lower water activities can be used.

Another highly preferred optional ingredient in the present batters is nonfat dry milk solids. Nonfat dry milk solids aid the structuring of the finished baked good. If present, such dry milk solids can comprise from about 0.5 to 2.0% of the present batters.

Leavening System

The batters described herein can have different types of leavening systems such as chemical leavening or gas leavening or both. These are described in detail below:

$N_2O$

The batters further essentially comprise sufficient amounts of $N_2O$ to provide a batter having a density of about 0.7 to 1.1 g/cc, preferably about 0.75 to 1.0 g/cc. Generally, prior to admixture of the $N_2O$ as described further below, the batters have densities ranging generally between about 0.9 to 1.3 g/cc. Surprisingly, admixture of $N_2O$ into the batter in sufficient amounts can function as a leavening agent to provide leavened finished baked goods. A portion of the $N_2O$ is dissolved in the batter while a portion is physically entrapped. Both the physically entrapped gas and the chemically dissolved or soluble gas in the batter provide the leavening action during baking and a desirable end product texture. Generally, about 5–10 times the amount of $N_2O$ is entrapped as compared to that which is chemically dissolved into the batter.

Alternatively the nitrous oxide gas can be incorporated in the fat phase and then the fat phase is mixed with the batter. In this embodiment, the fat phase becomes the vehicle of adding nitrous oxide gas into the batter. Further, this embodiment can contain protected chemical leavening in addition to the incorporated nitrous gas in the fat phase as leavening.

In certain preferred embodiments, the $N_2O$ alone functions to provide the leavening action. In these preferred embodiments, the batters are further defined as being essentially free (i.e., containing less than 0.5 wt. %) of conventional $CO_2$ generating ingredients such as conventional soda constituents. By eliminating the presence of such $CO_2$ generating ingredients, the undesirable interaction between the acidic ingredients and soda ingredients is avoided. Premature generation of $CO_2$ is avoided (such as during extended room temperature storage). Such minimization is especially desirable when the present batters are packaged in gas impermeable containers. Such premature $CO_2$ generation can lead to undesirable package pressurization and possible rupture. Thus, an advantage of the present invention is the provision of a leavened batter that exhibits minimal leavening degradation over time. An additional advantage is that the desired initial batter pH can be maintained during extended storage.

Chemical Leavening System

In certain embodiments, the batters herein preferably further comprise only conventional Chemical leavening system. Conveniently, either the acid component or soda component are encapsulated or otherwise sequestered to minimize premature interaction between the acid and the $CO_2$ generating component of the leavening system ingredient.

In the most preferred embodiment, the batter contains both gas admixed with batter and protected chemical leavening as part of the whole leavening system.

The present articles further essentially comprise an initial inert gas in the headspace of the container not occupied by the batter, e.g. $N_2$, $CO_2$, $N_2O$, and mixtures thereof. While noble gases can also be used, such gases are not economically practical. The residual oxygen content is less than 4%, preferably less than 2%. In highly preferred embodiments the headspace gas essentially comprises $N_2O$ in the present invention. A large amount of $N_2O$ is added to the batter to create a low-density batter "aerated" with $N_2O$. This large amount of $N_2O$ can act as the sole leavening ingredient. Addition of $N_2O$ also to the headspace facilitates equilibrium between the headspace and the batter.

In preferred embodiments, the headspace comprises at least 10% (v/v) of $CO_2$, preferably at least 20%. At such levels, the $CO_2$ provides modest preservative properties against spoilage. In certain embodiments, N2 can also comprise the head space either by itself or in combination with N2O or CO2.

Method of Preparation

The batters of the present invention are prepared by blending the essential and optional components together in such a manner as to produce a well blended, low density $N_2O$ containing batter having densities ranging from about 0.7 to 1.1 g/cc.

In a preferred method of preparation, a preblend of the dry ingredients is made. If employed oil or shortening is melted to form a liquid. A portion of the water is used to prehydrate the emulsifiers. Thereafter, the liquid ingredients are combined to form a wet mixture or emulsion. The wet mixture and dry preblend are then combined under anaerobic conditions to form a batter. The batter can, for example, be prepared in a batch or a continuous mixing device adapted to add gas. A composition may have more than one liquid mixture.

In certain embodiments, an aqueous dispersion of water, humectants such as glycerol or sorbitol or other polyols, and sugar syrup such as corn syrup or maltose syrup or fructose syrup is made and added to the batter.

In certain embodiments, the shortening is directly added to either the dry ingredients or while blending liquid and dry ingredients. Emulsifiers are added as part of the liquid emulsion or as a separate emulsifier dispersion comprising water, emulsifiers, polyols such as glycerol or others, sugars such as maltose syrup etc.

The essential $N_2O$ can be admixed with the batter to form an $N_2O$ aerated low-density batter in any convenient manner. For example, the admixture step can conveniently be practiced using a twin screw extruder equipped with gas injection means. The dry ingredients and wet ingredients are added to the twin screw extruder to form a batter. At a later stage of the extruder, $N_2O$ gas is injected and mixed in the extruder with the batter to incorporate sufficient amounts of the $N_2O$ to form the low density $N_2O$ containing batter. An advantage of using a twin screw extruder is that a single piece of equipment is used to prepare the batter and incorporate the $N_2O$ to form the low-density batter. The $N_2O$ also serves to reduce the residual oxygen level in the batter. As a result, repeated oxygen purging steps to flush out oxygen from the article as taught as being essential in the prior art can be avoided. An additional benefit is increase in the rate and ease of commercial production of the present articles.

Another method is to prepare a high density batter (e.g., 1.10 to 1.30 g/cc) using conventional batter preparation mixers and techniques. Thereafter, in a separate substep or piece of equipment, $N_2O$ is admixed with the high-density batter to form the present low-density batter. For example, a well-known "Goodway" mixer e.g., A Goodway CM-6 continuous mixer can be used to practice the incorporation step. A "Goodway" mixer is often used in the aerated confection industry to aerate confection slurry to form aerated foam. The CM-6 continuous mixer/foamer manufactured by Goodway Sales, Inc., 175 Orville Drive, Bohemia, N.Y. consists of mixing chamber fed by a positive displacement pump and air flow system. Product flow is controlled by pump speed adjustment and air flow is controlled by flowmeter adjustment. Variable speed motors with ten turn controls power the mixer and pump drives. Stainless steel concentric rows of intermeshing teeth on two stators and one rotor produce a uniformity and consistency in the mix.

The high-density batter is fed to the Goodway mixer. An $N_2O$ supply feeds the mixer. After incorporation, a low density $N_2O$ containing batter is formed.

Other well-known apparatus and techniques (e.g. whippers or aerators) can be used to practice the N2O incorporation into the batter step, e.g., an "Oakes" whipper (used in the confection art).

In still another variation a Mondomix Continuous Aerator. Mondomix technology emulsifies and/or aerates gas, liquid and solid mixtures. The heart of the equipment is a stainless steel mixing head, which operates from 200 to 2,000 rpm. It consists of 150 square stainless steel pins distributed in an intermeshing array between a rotor and a stator. These components are contained within a mixing chamber with an effective volume of 300 ml. The mixing chamber is double jacketed to control product temperature when mechanical energy is introduced to emulsify and aerate product streams.

The incorporation of $N_2O$ herein is to be distinguished from merely flushing of $O_2$ with $N_2O$ as known in the art, even when several flushing cycles are practiced. Such mere flushing of $O_2$ with $N_2O$ does not result in a low-density batter as in the present invention.

Desired quantities of the low density $N_2O$ containing batters are then charged to or are otherwise disposed within the container to partially fill the container. The batter filled container is then flushed or charged with inert gas or gas blends to insure low oxygen atmosphere in any unfilled headspace. The containers are then sealed to form the finished ready-to-use container articles.

The temperature of batter during filling step can be at room to warm temperatures, e.g., 60 to 100° F. (21.1 to 37.7° C.).

The packaged ready-to-bake baked goods batter articles herein do not require heat treatment such as pasteurization or refrigeration in order to obtain shelf stability. The products enjoy microbial stability and retain their good baking properties for as long as four to nine months or longer at room temperature storage.

The articles so prepared enjoy extended shelf stability at room temperature and do not require refrigerated storage.

The articles are packaged to be substantially unpressurized, i.e. can be packaged at atmospheric pressure.

The present batters are conveniently prepared into finished baked goods by simple addition to a suitable baking container or pan and baking to form a finished baked good. The batter is charged into a baking container and baked for sufficient times, for example, at 160° to 218.3° C. (325° to 425° F.) for about 10 to 40 minutes to form a finished baked good.

Baking time depends on the thickness of the batter in the pan, with a longer bake time required for a thicker (higher) batter. Bake times range between about 10 to 45 minutes. The resultant finished baked goods are characterized by a highly moist but not sticky or tacky texture. The finished baked goods are further characterized by being expanded or leavened and typically have densities ranging from about 0.3 to 0.6 g/cc. The finished baked goods are ready for immediate consumption or can be prepared on a commercial scale for distribution.

While the present invention finds particular suitability for use in connection with baked items such as layer cakes, quick breads, coffee cakes, muffins, brownies, in another variation, the batters can be used to prepare skillet items such as pan cakes, crepes or items such as waffles.

Also, while the present articles do not require refrigeration, the articles can be cooled and stored at refrigeration temperatures.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes, which come within the meaning and range of equivalency of the claims, are intended to be embraced therein.

What is claimed is:

1. A ready-to-use batter article useful for baked goods, comprising:
    an essentially gas-impermeable container;
    a batter disposed within the container, comprising:
        flour, sugar, moisture and salt, said batter having a sugar to flour ratio of about 0.5:1 to about 2.5:1,
        a moisture content of about 5 to 30%, and
        a water activity of less than 0.85;
        a pH of about 6 to 8.5;
        about 1% to 25% fat, at least a portion of which is provided by a palm oil hardstock;
    about 0.1% to 6% emulsifiers; and
    a leavening system; and
    an inert gas disposed within the container containing less than 4% residual oxygen.

2. The batter article of claim 1 wherein the batter being substantially free of any conventional $CO_2$ gas producing leavening agents.

3. The batter article in claim 2 wherein the CO2-free leavening system consists of batter mixed with Nitrous oxide.

4. The batter article in claim 1 wherein the leavening system comprises of nitrous oxide mixed with the batter.

5. The batter article in claim 1 wherein it contains sufficient amounts of $N_2O$ to provide the batter having a density of about 0.7 to 1.1 g/cc.

6. The batter article in claim 1 wherein the nitrous oxide is first mixed with the fat phase, and this fat phase is added to the batter.

7. The batter article in claim 1 wherein the leavening system consists of protected chemical leavening system.

8. The batter article in claim 7 wherein sodium bicarbonate is encapsulated in the protected chemical leavening system.

9. The batter article in claim 7 wherein both sodium bicarbonate and leavening acids are encapsulated in the protected leavening system.

10. The batter article in claim 7 wherein at least a portion of the emulsifiers are mixed in with the shortening system.

11. The batter article in claim 1 wherein the leavening system consists of gas admixed in the batter and a protected chemical leavening system.

12. The batter article in claim 1 wherein all the emulsifiers are prehydrated.

13. The batter article in claim 1 wherein none of the emulsifiers are prehydrated.

14. The batter article of claim 1 wherein inert gas comprises at least 10% $CO_2$.

15. The batter article of claim 1 shelf stable at room temperature for at least four months.

16. The batter article of claim 1 wherein the inert gas is selected from the group consisting of $N_2O$, N2, CO2 and mixtures thereof.

17. The batter article of claim 1 wherein the container comprises a flexible pouch.

18. The batter article of claim 1 wherein the container comprises a rigid tub.

19. The batter article of claim 1 wherein the batter additionally comprises about 1 to 10% cocoa.

20. The batter article of claim 1 wherein the batter additionally comprises about 1% to 8% of a humectant.

21. The batter article of claim 20 wherein the humectant comprises glycerol or sorbital or a mixture thereof.

22. The batter article of claim 1 wherein the batter additionally comprises about 0.01 to 0.2% gellan gum.

23. The batter article of claim 22 wherein the batter additionally comprises about 5 to 200 ppm calcium ions.

24. The batter article of claim 1 wherein the batter additionally comprises about 1 to 5% eggs.

25. The batter article of claim 1 wherein the batter additionally comprises about 0.1 to 6% emulsifiers.

26. The batter article of claim 1 wherein the batter additionally contains sodium, potassium sorbate, benzoate, propionic acid, calcium propionate, or parabens.

27. The batter article in claim 1 wherein at least a portion of the emulsifiers are prehydrated.

28. A method of fabricating a ready-to-bake article, comprising the steps of:

providing an open sealable, gas impermeable container;

dispensing, within at least a portion of the container, a batter including:
about 25 to 75% sugar
about 10 to 40% flour
about 0 to 5% egg solids
about 0.1 to 3% salt
about 0.1 to 6% emulsifiers
about 1 to 25% fat, at least a portion of which is provided by palm oil hardstock
about 5 to 30% moisture
said batter having a sugar to flour ratio of about 1.5:1 to 2.5:1,
a water activity of less than 0.85, and
a pH of about 6 to 8.5;

filling a headspace portion of the container that is unfilled with the batter with an inert gas having an oxygen content of less than 4%; and sealing the container to form a shelf stable ready-to-bake batter article.

29. The method of claim 28 further comprising: fabricating the container from a flexible material.

30. The method of claim 28 further comprising: fabricating the container into a tub or a pouch.

31. The method of claim 28, wherein the inert gas in the headspace has an oxygen content of less than 2%.

32. The method of claim 31 wherein the inert gas in the headspace comprises $N_2O$.

33. The method of claim 31 wherein the batter has an oxygen content of less than 2%.

34. The method of claim 28 wherein all the moisture is supplied by pasteurized eggs.

35. The method of claim 28 wherein at least some of the moisture is supplied by pasteurized eggs.

36. The method of claim 28 wherein none of the moisture is supplied by pasteurized eggs.

* * * * *